United States Patent [19]
Miro

[11] Patent Number: 6,166,852
[45] Date of Patent: Dec. 26, 2000

[54] WINDOW FILM WITH OPTICAL BRIGHTENER

[75] Inventor: Frank Miro, Tierra Verde, Fla.

[73] Assignee: Film Technologies International, Inc., St Petersburg, Fla.

[21] Appl. No.: 08/944,076

[22] Filed: Oct. 4, 1997

[51] Int. Cl.[7] .................................. F21V 9/06; F21V 9/04
[52] U.S. Cl. .......................................... 359/361; 359/359
[58] Field of Search .................................... 359/361, 350, 359/359

[56] References Cited

U.S. PATENT DOCUMENTS

| | | | |
|---|---|---|---|
| 3,854,950 | 12/1974 | Held | 96/82 |
| 4,869,993 | 9/1989 | Farahat et al. | 430/143 |
| 5,270,116 | 12/1993 | Melancon et al. | 428/447 |
| 5,387,458 | 2/1995 | Pavelka et al. | 359/361 |
| 5,523,877 | 6/1996 | Lynam | 359/361 |
| 5,783,307 | 7/1998 | Fagerburg et al. | 428/412 |

*Primary Examiner*—Cassandra Spyrou
*Assistant Examiner*—Jared Treas
*Attorney, Agent, or Firm*—Donald R Barr

[57] ABSTRACT

The disclosure of this invention relates to window solar control films and more particularly, to window treatment films that incorporate both an ultraviolet absorber and an optical brightner. The disclosure is concerned primarily with a multi layer film construction and method for the enhancement of the optical properties of window treatment films, by the use of optical brightner in at least one layer component of a multi layer window film. The window solar control film has enhanced the optical properties and absorbs most of the ultraviolet radiation. The subject multilayer film absorbs radiation in the range of 300 to 410 n.m. and does not have an undesirable yellowish tint or hue.

30 Claims, 1 Drawing Sheet

WINDOW FILM WITH OPTICAL BRIGHTENER

FIELD OF THE INVENTION

This invention is concerned with window film technology. In accordance with this invention, the optical properties of a window film are enhanced by use of an optical brightner in combination with a ultraviolet absorption system. As a result of this enhancement most of the ultraviolet radiation is absorbed and undesirable yellowish hues and tints are eliminated.

BACKGROUND OF THE INVENTION

The application of films to windows for various purposes is quite common. The films may be applied to any type of window pane for example polymeric or glass panes. Films are applied to window panes for a variety of reasons. For example films can be applied to window panes to affect the ability of these panes to absorb or transmit heat, further films can be applied in order to change the color of a window pane, likewise films can be applied in order to increase the strength of a window pane and in particular the ability of the window pane to stay in tact after an impact by a foreign object. Films are also applied to window panes in order to alter the ability of the window pane to transmit, absorb or reflect visible and invisible solar radiation. It is this latter mentioned area namely the ability of a film to alter the ability of a window pane to transmit solar energy that this invention is primarily concerned. That is this invention is concerned with the interreaction of solar ultraviolet radiation with a solar control window film. More particularly this invention is concerned with window film compositions and constructions whereby the ability of a window pane to transmit solar energy in the ultraviolet and lower visible range is altered by the application of a multilayer composite film to the window pane.

The addition of ultraviolet absorbers to solar control window films in order to alter the ability of a window pane to transmit ultraviolet radiation is known in the prior art. In many instances when an ultraviolet absorber is added to a window solar control film, the resulting overall composite structure, when the film is applied to a window pane has an undesirable yellow hue or tint. This yellow tint or hue originates with the ultraviolet absorber when an effective amount of ultraviolet absorber is added to the window film. In accordance with this invention this yellow hue or tint is eliminated. The objectionable yellow tint or hue may be best described as a slight straw color and is particularly evident in clear films.

The high ultraviolet light absorbing solar control window films, of this invention are useful in environments where ultraviolet rays may degrade the contents of a building or cause health problems for the occupants of these buildings. For example ultraviolet radiation entering a building through its windows will cause carpet and wallpaper to fade. Further the health of the occupants can be affected for example exposure to ultraviolet radiation can cause skin cancer. With this invention, it is possible to eliminate the transmission of solar ultraviolet radiation through a window pane and yet produce a window film which is superior to the prior art films in color.

These ends are accomplished by utilization of an optical brightener in combination with an ultraviolet absorber in a multilayer window treatment film.

BRIEF DESCRIPTION OF THE INVENTION

Figure 1:
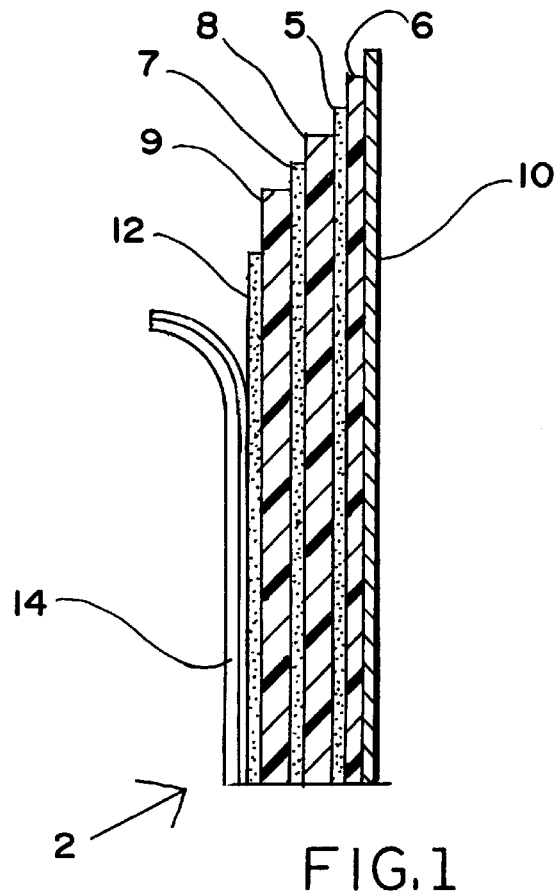
FIG. 1 is a cross section view of the preferred multiple layer embodiment of this invention.

The use of solar control window films for the purpose as described above is well known in the prior art. Further incorporation of ultraviolet absorber into these films to increase ultraviolet absorption above 380 n.m. is well known in the prior art. The bonding of multiple layers of polymeric film together with adhesive systems to form composite window films is also known. Both the film layers which incorporate large amounts of an ultraviolet absorbers sufficient to absorb most of the ultraviolet radiation above 380 n.m. and the bonding adhesives are disadvantageous in that they exhibit an objectionable yellowish hue or tint.

This invention is concerned with a means whereby this undesirable yellowish hue or tint can be eliminated by incorporating of an optical brightener into one or more layers of a composite film system.

In the preferred embodiment the layer or layers, of the composite system, which incorporate an optical brightener are sandwiched between two layers which incorporate ultraviolet absorbers. That is the layer which incorporates the optical brightener is sandwiched between an outside layer which faces the radiation source i.e. sunlight, this outside layer incorporating an ultraviolet absorber, and an inside layer which also incorporates an ultraviolet absorber.

In some embodiments the use of the inside layer incorporating the ultraviolet absorber may be eliminated.

The use of an optical brightener in combination with an ultraviolet absorber eliminates all undesirable fluorescence and objectional yellowish tints and hues.

DESCRIPTION OF THE PREFERRED EMBODIMENT

As is discussed above, this invention is concerned with solar control window film technology. Window films have been used for over thirty years and have become very popular in the last decade, these films are generally polymeric films which are bonded to the window pane with an adhesive. Ultraviolet absorbers have been added to window films for at least twenty years however when these ultraviolet absorbers are used, in an amount sufficient to absorb most of the ultraviolet radiation, these ultraviolet absorbers impart an undesirable yellow tint or hue to the film. These solar window control window films may be applied to either the inside or outside of a window pane. In the most common applications these films are applied to the inside of the window pane. In the most common applications the films in question are adhered to the window pane by a pressure sensitive adhesive The prior art films which are capable of high ultraviolet absorption were undesirable from a aesthetic point of view in that these films exhibited a yellowish tint or hue which could best be described as a slight straw color due to the high concentration of ultraviolet absorber. In accordance with this invention a film which is capable of high ultraviolet absorption is created wherein the resulting film does not have an undesirable yellow hue or tint. This end is accomplished by absorbing part of the ultraviolet band with an ultraviolet absorber and the remainder with an optical brightener.

Window films with the ability to absorb a high percentage of ultraviolet light are formed by the lamination of at least two layers of polyester clear film. An ultraviolet absorber is incorporated into the composition of at least one of these clear polyester films. This absorption of most of the ultraviolet radiation further prevents the ultraviolet radiation from being transmitted through the film in such a manner that the ultraviolet radiation can degrade articles such as carpet on the inside of the building of which the window is a part. These ultraviolet absorbers when incorporated in the polyester film do a fine job of absorbing radiation in the ultraviolet region however when an effective amount of an ultraviolet absorber is utilized the resulting polyester film exhibits an undesirable yellowish tint or hue. This yellowish tint makes these window films objectionable.

Further the multilayer polyester film system as described above are laminated together with an adhesive which likewise tends to have a slight yellowish tint or hue which is inherent in the adhesive polymeric system and the additives therein. This yellowish tint or hue which is inherent in the adhesive is also eliminated by use of optical brighteners in accordance with this invention.

The composite film of this invention comprises one layer which incorporates an ultraviolet absorber, this layer absorbs ultraviolet radiation between 300 and 380 n.m. Another layer incorporates an optical brightener. In order to be effective for use in this invention the optical brightener must be capable of at least absorbing in the range of 300 to 410 n.m.

Ultraviolet absorbers and optical brighteners are added to the layers of the composite film in accordance with this invention. It is within the purview of this invention to add to the layers of the composite film of this invention other compatible materials which do not affect the basic novel characteristics of the composition of this invention. Among, such materials are antioxidants, antistatic agents, and stabilizers.

The subject invention is adapted to utilize a wide variety of optical brighteners provided they are capable of at least absorbing in the range of 380 to 410 n.m. Naturally, the optical brightener utilized must be compatible with the; polymer which comprises the base stock of the film used therein. Examples of suitable optical brighteners which can be used in accordance with this invention are Uvitex OB as sold by CIBA Specialty Chemicals Inc.,. Uvitex OB is thought to be 2.5-Bis (5-tert-butyl-2-benzoxazolyl) thiophene. Examples of other optical brighteners suitable for use in accordance, with this invention are as follows: Leucopure EGM and Leucopure BS as sold by Sandoz, East Hanover, N.J. 07936. Leucopure EGM is thought to be 7-(2h-naphthol) (1,2-d)triazol-2-yl)-3-phenyl-coumarin. Phorwhite K-2002 as sold by Mobay Chemical Corporation, P.O. Box 385, Union Metro Park, Union, N.J. 07083 is thought to be pyrazoline derivative. Eastobrite OB-1 as sold by Eastman Chemical Products, Inc., Kingsport, Tenn., is thought to be 4,4'-Bis(2-benzoxazoly) stilbene.

The percentage of optical brightener which can be used in accordance with this invention is from about 0.5% to about 6% as based on the weight of the film resin solid. A more preferred range is from about 2% to about 4% with the most preferred range being from about 2.8% to about 3.2%, all percentages being weight percent. The optical brightener may be compounded into the polymeric film during the processing of this film or into an adhesive which is used to bond various film layers together. It is understood by one skilled in the art that the percentage of optical brightener used may be affected by its compatibility with the film resin substrate.

In accordance with the above discussion this invention is concerned with the interreaction of one layer of a composite film which incorporates an ultraviolet absorber with another layer of the composite film which incorporates an optical brightener. A wide variety of ultraviolet absorbers may be used. Examples of ultraviolet absorbers which may be used in accordance with this invention are triazine type ultraviolet absorbers such as Cyagard UV 11641 as is sold by American Cyanamid Company and benzotriazol type ultraviolet absorbers such as Tinuvin 1130 as sold by CIBA Specialty Chemicals Inc.

The concentration ultraviolet absorber used in accordance with this invention may be from about 10% to about 30% as based on the weight of the film resin solid. A more preferred concentration range is from about 15% to about 25% with the most preferred range being from about 18% to about 23%, all percentages being weight percent and based on the film resin solid.

The subject invention uses multiple layers of clear film to form the composite film. A wide variety of polymeric bases may be used to form these films. For example: these films may be formed from polyester resins, or acrylic resins.

The preferred base for the formation of the films in accordance with this invention are polyester resins as are sold by DuPont DeNemous & Company under the trademark Mylar.

Adhesives are used to bond the various layers together and are described herein below in connection with the examples and the preferred embodiment.

The composite film of this invention generally has an inner and an outer side. The outer side is placed, on the window pane, in such a manner that it faces the source of troublesom radiation, usually sunlight. Therefore the outer side of the film is the side that faces the outside of the building to which the window is attached. In contrast the inner side of the composite film is opposite the outer side and faces inward on the building to which the window is attached.

The various layers of the film of this invention cooperate in such a manner that most of the harmful ultraviolet radiation is filtered out and the film does not have an objectional yellow hue or tint.

To accomplish these ends at least one layer on the outer side of the film incorporates an ultraviolet absorber. This layer filters out most of the radiation at least in the range of 300 to 380 n.m. Inward of the layer which incorporates the ultraviolet absorber is a layer which incorporates an optical brightener. This layer filters out radiation in the range of 380 to 410 n.m. The optical brightener may be incorporated into a layer of polymeric film or in an adhesive which bonds one or more layers of the composite film together. The latter mentioned embodiment wherein the optical brightener is in the adhesive is the preferred embodiment.

In the absence of an ultraviolet absorber on the outside of the optical brightener containing layer, the optical brightener tends to fluorescence.

In order to make sure that there is no undesirable fluorescening in the preferred embodiment a second layer containing an ultraviolet absorber may be placed inward of the layer which incorporates the optical brightener. This second layer further prevents optical brightener from fluorescencing as a result of the optical brightener being exposed to ultraviolet radiation which may originate on the inside of the building, for example from fluorescent lighting.

As a result of the above described multilayer composite structure all of the undesirable ultraviolet light and the lower end of the visible light range are filtered out. Therefore the total band of undesirable ultraviolet radiation are prevented from entering a building thought windows which is covered with the composite film of this invention.

The composite film in accordance with this invention filters out radiation between 300 and 410 n.m.

As per the above description a yellowish tint can result from the physical properties of an ultraviolet absorber an from the adhesives which are used to bond one or more film layers together. In accordance with this invention these yellowish tints are minimized or eliminated by the incorporation of an optical brightener into the composite system.

FIG. 1 illustrates a preferred film construction 2 which consist of a multi-ply film. In this embodiment a 1.0 mil clear nonweatherable layer 4 of polyester film is laminated to a 0.5 mil layer 6 of clear weatherable film, c.w 92 which is sold by Courtaulds Performance Films which incorporates an ultraviolet absorber. This lamination is effected with an adhesive layer 5 which incorporates 1.5 weight percent of Unitex OB. The laminating adhesive 5 is formulated from a solution of 19 weight percent Adcota 76R36 polyester resin sold by Morton International, Inc. dissolved in solvent systems which comprises 80 weight percent by methyl ethyl ketone and 20 weight percent toluene. To this adhesive solution, 4.2 weight percent a diiocyanate coreactant is added during the application of the adhesive to the polyester film. The adhesive is applied to the 1 mil clear polyester film 4 with a wire rod application at a coat weight of 2.0 lbs/ream. After the application of the adhesive solution to the 1.0 mil polyester, film 4 is transported through a convection oven at a temperature of about 200 F and a line speed of about 130/FPM. The heat of the oven drives off the solvents leaving the resin and additive coreactant plus UVITEX OB ready for nipping to the 0.5 mil clear weatherable polyester film 6. After nipping a composite 1.5 mil construction results.

A second coating of a laminating adhesive layer 7 is applied to side 8 of the 1.0 mil layer of the composite 1.5 mil laminate. This second laminating adhesive comprises 18 weight percent of an acrylic pressure sensitive adhesives which is dissolved in the above described methyl ethyl ketone ethyl ketone/toluene, solvent system plus UVITEX OB at a concentration of 1.5 weight percent. With this second adhesive layer 7 a 1 mil non weatherable polyester layer 9 is applied with a wire rod at a coating weight of 4.0 lbs/ream. Another laminating adhesive layer is applied to the 2.5 mil laminate. Then the composite structure is transported through the oven at a temperature of about 200 F and a line speed of about 100/FPM. The resulting product is a 3 ply 2.5 mil construction with both layers of the laminating adhesives containing UVITEX OB optical brightener.

To complete the construction of the resulting 2.5 mil product, an ultraviolet curable hardcoat 10 is applied to 0.5 mil weatherable side of the construction. The hardcoat prevents scratching or scuffing of the film. To the opposite side of the 2.5 mil. construction, that is the nonweatherable side, a pressure sensitive adhesive layer 12 which incorporates approximately 12.5 weight percent of an ultraviolet absorber which is capable of absorbing radiation in the range of 300 to 380 n.m. is applied. Lastly a silicone release liner 14 is applied to the composite structure. Hardcoat layer 10 is applied at about a 1.0 lb/ream coating also with the use of a wire rod. The hardcoat layer 10 is ultraviolet cured at a line speed of 170/FPM. Pressure sensitive adhesive layer 12 is applied via transfer coating using silicone release liner at a coating weight of about 5.0 lbs/ream. Pressure sensitive adhesive layer 12 can be applied by rod or slot die and it is cured by being transported through the oven at about 200 F at a speed of 100/FPM. The hardcoat layer 10 and the pressure sensitive adhesive layer 12 do not affect the ability of the subject composite system to remove yellow tints.

Figure 2:
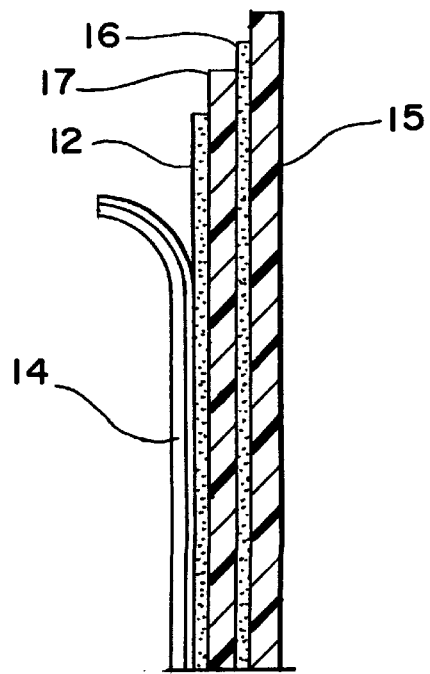
FIG. 2 is a cross section view of a two layer embodiment of the subject invention.

FIG. 2 shows the most basic version of this invention wherein a weatherable polyester film layer 15 which incorporates an ultraviolet absorber is bonded to a non weatherable polyester film layer 17 via an adhesive layer 16 which incorporates an optical brightener capable of absorbing radiation in the range of 300 to 410 n.m. Layer 15 is capable of absorbing radiation in the range of 300 to 380 n.m. To complete the structure a pressure sensitive adhesive layer 12 which incorporates approximately 12.5 weight percent of an ultraviolet absorber, capable of absorbing radiation in the range of 300 to 380 n.m., is applied along with release liner 14 to the laminate of layers 15 and 17.

While the above description discusses how the optical brightener can be formulated into an adhesive matrix, the optical brightener could likewise be incorporated into the polymeric film matix.

Although preferred embodiments have been described herein above, manufactures and variations may be made thereto in view of the above teachings. It is therefore understood by one skilled in the art that within the scope of the appended claims the subject invention may be produced otherwise than as specifically described.

What is claimed is:

1. A multilayer window solar control film which is formed from at least two layers of polymeric film wherein at least one of said layers incorporates an ultraviolet absorber and at least one of said layers incorporates an optical brightner, wherein the optical brightner is present at a concentration of from about 0.5 to about 6 weight percent, and where the layer which incorporates the optical brightner is capable of absorbing at least in the range of from about 300 to about 410 n.m.

2. The multilayer window solar control film of claim 1 wherein the layers of polymeric film are bonded together by at least one adhesive layer which incorporates an optical brightener.

3. The multilayer window solar control film of claim 2 wherein the ultraviolet absorber is present in a layer at a concentration of from about 10 to about 30 weight percent, and where the layer which incorporates the ultraviolet absorber, absorbs in the range of from about 300 to 380 n.m.

4. The multilayer window solar control film of claim 2 wherein the optical brightener is present in a layer at a concentration of from about 0.5 to about 6 weight percent, where the layer which incorporates the optical brightener absorbs in the range of from about 300 to about 410 n.m.

5. The multi layer window solar control film of claim 2 wherein the ultraviolet absorber is present in a layer at a concentration of from about 15 to about 25 weight percent and the optical brightener is present in a layer at a concentration of from about 2 to about 4 weight percent.

6. The multilayer window solar control film of claim 2 wherein said window treatment film has an inner layer which absorbs between 300 and 380 n.m. and which incorporates an ultraviolet absorber at a concentration of from about 18 to about 23 weight percent, an outer layer which is capable of absorbing at least between 300 and 380 n.m. and which incorporates an ultraviolet absorber at a concentration of from about 18 to about 23 weight percent and wherein sandwiched between said inner and outer layers is an intermediate layer which absorbs between 300 and 410 n.m. and which incorporates an optical brightener at a concentration of from about 2.8 to about 3.2 weight percent.

7. The multilayer window solar control film of claim 6 wherein the polymeric films are polyester and the optical brightener is 2,2'-(2,5-Thiophenediyl)bis[5-tert-butylbenzoxazol].

8. The multilayer window solar control film of claim 2 wherein the layer(s) which incorporate an ultraviolet absorber, absorbs radiation in the range of from about 380 to about 410 n.m. and wherein the layer(s) which incorporate an optical brightener absorb radiation in the range of from about 300 to about 410 n.m.

9. The multilayer window solar control film of claim 1 wherein the ultraviolet absorber is present in a layer at a concentration of from about 10 to about 30 weight percent, and where the layer which incorporates the ultraviolet absorber, absorbs in the range of from about 300 to about 380 n.m.

10. The multi layer window solar control film of claim 1 wherein the ultraviolet absorber is present in a layer at a concentration of from about 15 to about 25 weight percent and the optical brightener is present in a layer at a concentration of from about 2 to about 4 weight percent.

11. The multilayer window solar control film of claim 1 wherein said window treatment film has an inner layer which absorbs between 300 and 380 n.m. which incorporates an ultraviolet absorber at a concentration of from about 18 to about 23 weight percent, an outer layer which is capable of absorbing at least between 300 and 380 n.m. and incorporates an ultraviolet absorber at a concentration of from about 18 to about 23 weight percent and wherein sandwiched between said inner and outer layers is an intermediate layer which absorbs between 300 and 410 n.m. and which incorporates an optical brightener present at a concentration of from about 2.8 to about 3.2 weight percent.

12. The multilayer window solar control film of claim 11 wherein the polymeric films are polyester and the optical brightener is 2,2'-(2,5-Thiophenediyl)bis[5-tert-butylbenzoxazol].

13. The multilayer window solar control film of claim 1 wherein the layer(s) which incorporate an ultraviolet absorber, absorbs radiation in the range of from about 300 to about 380 n.m. and wherein the layer(s) which incorporate an optical brightener which is capable of radiation at least in the range of from about 300 to about 410 n.m.

14. A multilayer window solar control film which is formed from at least three layers of polymeric film wherein an intermediate layer which incorporates an optical brightner is sandwiched between two layers which incorporate an ultraviolet absorber, wherein the optical brightner is present at a concentration of from about 0.5 to about 6 weight percent, and where the layer which incorporates the optical brightner is capable of absorbing at least in the range of from about 300 to about 410 n.m.

15. The multilayer window solar control film of claim 14 wherein the layers of polymeric film are bonded together by at least one adhesive layer which incorporates an optical brightener.

16. The multilayer window solar control film of claim 15 wherein the ultraviolet absorber is present in a layer at a concentration of from about 10 to about 30 weight percent, and where the layer which incorporates the ultraviolet absorber, absorbs in the range of from 300 to about 380 n.m.

17. The multilayer window solar control film of claim 15 wherein the optical brightener is present in a layer at a concentration of from about 0.5 to about 6 weight percent, where the layer which incorporates the optical brightener which is capable of absorbing at least in the range of from about 300 to about 410 n.m.

18. The multi layer window solar control film of claim 15 wherein the ultraviolet absorber is present in a layer at a concentration of from about 15 to about 25 weight percent and the optical brightener is present in a layer at a concentration of from about 2 to about 4 weight percent.

19. The multilayer window solar control film of claim 15 wherein said window treatment film has an inner layer which is capable of absorbing at least between 300 and 380 n.m. and which incorporates an ultraviolet absorber at a concentration of from about 18 to about 23 weight percent, an outer layer which absorbs between 300 and 380 n.m. and which incorporates an ultraviolet absorber at a concentration of from about 18 to about 23 weight percent and wherein sandwiched between said inner and outer layers is an intermediate layer which absorbs between 380 and 410 n.m. and which incorporates an optical brightener at a concentration of from about 2.8 to about 3.2 weight percent.

20. The multilayer window solar control film of claim 19 wherein the polymeric films are polyester and the optical brightener is 2,2'-(2,5-Thiophenediyl)bis[5-tert-butylbenzoxazol].

21. The mutilayer window solar control film of claim 15 wherein the layer(s) which incorporate an ultraviolet absorber, absorbs radiation in the range of from about 300 to about 380 n.m. And wherein the layer(s) which incorporate an optical brightener which is capable of absorbing radiation in the range of from about 300 to about 410 n.m.

22. The multilayer window solar control film of claim 14 wherein the ultraviolet absorber is present in a layer at a concentration of from about 10 to about 30 weight percent, and where the layer incorporates the ultraviolet absorber, absorbs in the range of from about 300 to about 380 n.m.

23. The multi layer window solar control film of claim 14 wherein the ultraviolet absorber is present in a layer at a concentration of from about 15 to about 25 weight percent and the optical brightener is present in a layer at a concentration of from about 2 to about 4 weight percent.

24. The multilayer window solar control film of claim 14 wherein said window treatment film has an inner layer which absorbs between 300 and 380 n.m. and which incorporates an ultraviolet absorber at a concentration of from about 18 to about 23 weight percent, an outer layer which is capable of absorbing at least between 300 and 380 n.m. and which incorporates an ultraviolet absorber at a concentration of from about 18 to about 23 weight percent and wherein sandwiched between said inner and outer layers is an intermediate layer which absorbs between 300 and 410 n.m. and which incorporates an optical brightener at a concentration of from about 2.8 to about 3.2 weight percent.

25. The multilayer window solar control film of claim 24 wherein the polymeric films are polyester and the optical brightener is 2,2'-(2,5-Thiophenediyl)bis[5-tert-butylbenzoxazol].

26. The multilayer window solar control film of claim 14 wherein the layer(s) which incorporate an ultraviolet absorber, absorbs radiation in the range of from about 300 to about 380 n.m. and wherein the layer(s) which incorporate an optical brightener which is capable of absorbing radiation in the range of from about 300 to about 410 n.m.

27. The multilayer solar control film of claim 14 wherein the intermediate layer is an adhesive layer.

28. The multilayer solar control film of claim 14 wherein the intermediate layer is an adhesive layer and the layers which incorporate the ultraviolet absorber are polymeric films.

29. A composite multilayer window solar control film which comprises a first 1.0 mil clear nonweatherable polyester film which is laminated to a 0.5 mil clear weatherable polyester film wherein the weatherable and nonweatherable polyester films are bonded together with a first laminating adhesive layer, a second laminating adhesive layer which is applied to the first clear nonweatherable polyester film in order to secure the first clear nonweatherable polyester film to a second clear non weatherable polyester film, having a pressure sensitive adhesive layer opposite the first clear weatherable polyester film, wherein the weatherable polyester film and the pressure sensitive adhesive layer incorporate about 25 weight percent ultraviolet absorber and the first and second laminating adhesive layers incorporate about 1.5 weight percent of 2.2'-(2.5-thiophenediy) bis (5-tert-butylbenzoxazolel.

30. The composite multilayer window solar control film of claim 29 wherein the outer side of the clear weatherable polyester film is further coated with scratch resistant coating and a release liner is applied to the pressure sensitive adhesive layer.

* * * * *